March 11, 1924.
C. V. GESSLER
BUMPER
Filed March 28, 1923
1,486,740
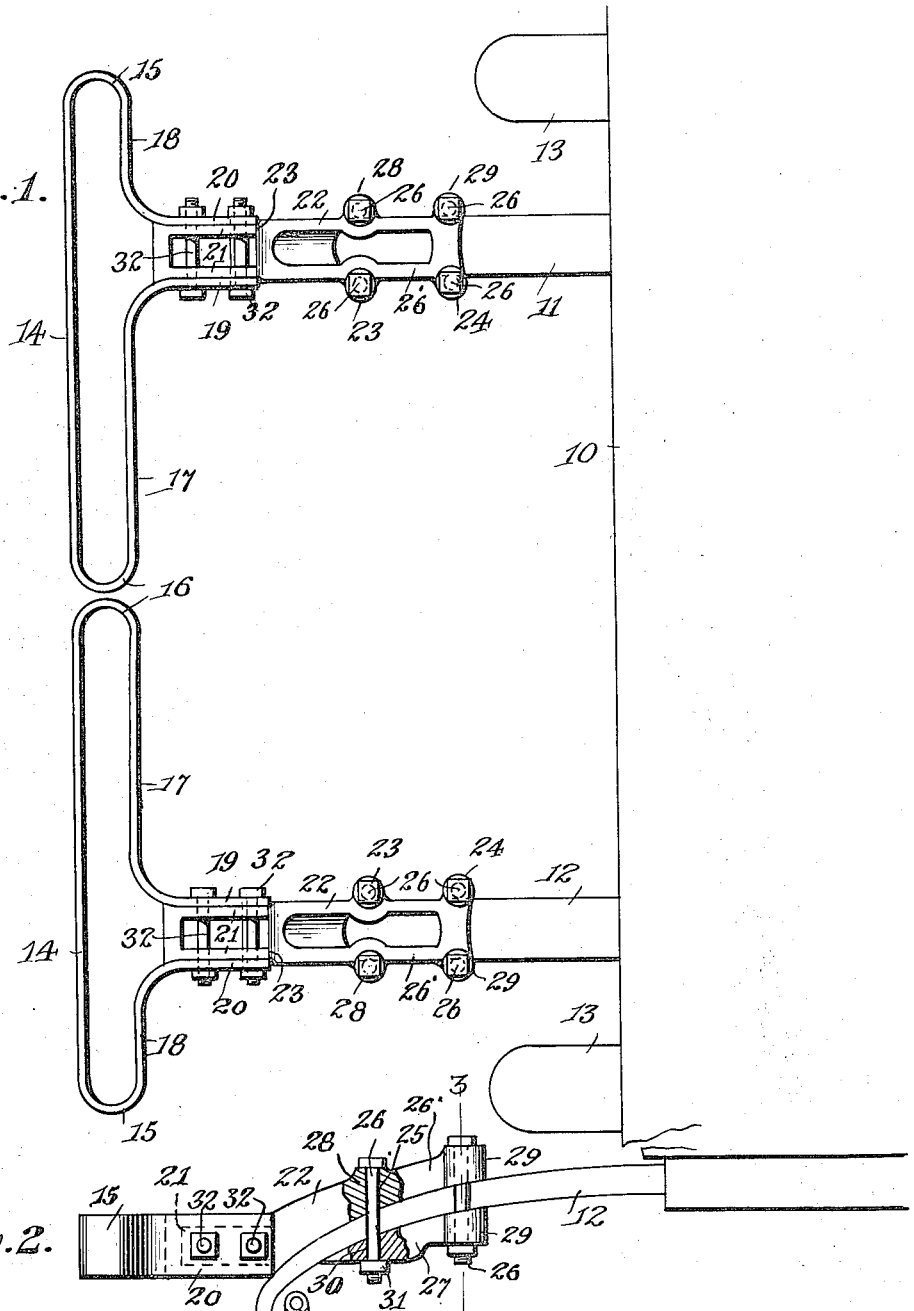
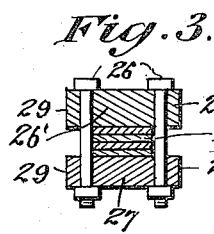
INVENTOR.
Clarence V. Gessler,
BY
Geo. P. Kimmel
ATTORNEY.

Patented Mar. 11, 1924.

1,486,740

UNITED STATES PATENT OFFICE.

CLARENCE V. GESSLER, OF INDIANA, PENNSYLVANIA.

BUMPER.

Application filed March 28, 1923. Serial No. 628,308.

*To all whom it may concern:*

Be it known that I, CLARENCE V. GESSLER, a citizen of the United States, residing at Indiana, in the county of Indiana and State of Pennsylvania, have invented certain new and useful Improvements in Bumpers, of which the following is a specification.

This invention relates to bumpers, designed primarily for use in connection with the rear end of a motor vehicle, but it is to be understood that a bumper in accordance with this invention can be employed for any purposes wherein it is found applicable, and the invention has for its object, to provide, in a manner as hereinafter set forth, a bumper providing a resilient body portion connected with and positioned to extend backwardly from the rear end of each of the springs of the vehicle to provide protection against damage to the rear of the vehicle in case of collision.

Further objects of the invention are to provide a bumper for the purpose set forth and in a manner as hereinafter referred to, which is simple in its construction and arrangement, strong, durable, thoroughly efficient in its use, readily set up, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 illustrates in plan, the arrangement of a pair of bumping elements in accordance with this invention, with respect to the rear end of a motor vehicle.

Figure 2 is a side elevation, partly in section, showing the connecting of a bumper with the rear end of the vehicle spring.

Figure 3 is a section on line 3—3, Figure 2.

Referring to the drawings in detail, 10 denotes the vehicle body 11, 12, the body springs which project rearwardly therefrom, and 13 the rear wheels of the vehicle.

A bumper in accordance with this invention, includes a skeleton impact element comprising a resilient body portion, and a combined hanger and clamping element for not only securing the resilient body portion to the rear end of the vehicle spring, but further in connection with the rear end of the spring, to suspend the resilient body portion in operative relation with respect to the rear of the vehicle body.

The resilient body portion is formed from a strip of spring steel and comprises an outer portion 14, a pair of curved end portions 15, 16, and an inner portion formed of two parts 17, 18, which are disposed in parallelism with respect to the outer portion 14. The part 17 extends from the curved end 16 and is of greater length than the part 18 which extends from the curved end 15. The part 17 merges into a shank portion 19, which extends towards the vehicle body 10 and which is disposed in parallelism with respect to, as well as being spaced from a shank portion 20, extended from the part 18 and towards the vehicle body 10.

The combined hanger and clamping element consists of an upper and a lower section. The upper section includes a skeleton rectangular body portion 21, which terminates in an upwardly inclined curved shank 22, of greater width than the width of the body portion 21, thereby providing shoulders 23. At the point of joinder of the shank 22 with the body portion 21, the height of the shank is the same as the height of the body portion 21, and said shank gradually decreases in height towards its free end. The lower face of the shank 22 is curved so as to conform to the curvature of the vehicle spring, and upon the latter the shank 22 is positioned, as shown in Figure 2. The shank 22 is formed at each side with laterally extending enlargements 23, 24, the former is arranged intermediate the ends of the shank and the latter at the free end of the shank. The enlargements 23, 24, are apertured, as at 25, for the passage of bolts 26, which when the shank 22 is mounted on the vehicle spring extend at the sides of the latter.

The lower section of the combined hanger and clamping element comprises a body portion 27, of less length than the length of the shank 22 and which has its upper face conforming in curvature to the curve of the vehicle spring. The body portion 27 is adapted to be positioned against the lower face of the vehicle spring and is formed with lateral enlargements 28, 29, which align with the enlargements 23, 24, and which are provided with openings 30, registering with the openings 25 and through which extend the bolts 26.

Bearing against the enlargements 28, 29, and carried on the lower end of the bolts 26, are securing nuts 31 for the purpose of retaining the bolts 26 in position.

When the bolts 26 are set up with respect to the shank 22 and body portion 27, the said shank 22 and body portion 27 are connected together and also connected to the vehicle spring, whereby the combined hanger and clamping element is connected in position with respect to the rear end of the vehicle spring.

When the shank 22 and body portion 27 are secured to the vehicle spring, the latter depends below said shank, as clearly shown in Figure 2, and bears against the free ends of the shank portions 19 and 20, under such conditions constituting a support for said shank portions.

The resilient body portion is connected with the body portion 21 of the upper section of the combined hanger and clamping element. The shank portions 19 and 20 are arranged at the sides of the body portion 21 and the free ends of said shank portions 19 and 20 not only abut against the shank portion 22, but also against the vehicle spring, as clearly shown in Figures 1 and 2. The shank portions 19, 20, are secured to the body portion 21 by a plurality of hold-fast devices, as shown each consisting of a bolt 32, provided with a securing nut 33. The bolts 32 extend through the shank portions 19, 20, and the body portion 21, as clearly shown in Figure 1.

As the inner portion of the resilient body portion of the bumper element is formed of two parts, one of greater length than the other, the shank portions 19, 20, are disposed eccentrically with respect to the transverse center of said resilient body portion, whereby when said resilient body portion is secured by the combined hanger and clamping element to the vehicle spring, the part of said resilient body portion extending inwardly from the vehicle spring will be of greater length than that part which projects outwardly with respect to the vehicle spring.

When the resilient body portions are secured with the vehicle spring, they are oppositely disposed with respect to each other and are so set up that they will extend to a position in close proximity to each other, and this is due to the fact that the resilient body portions are eccentrically connected to the combined hanger and clamping elements which are secured upon the rear ends of the vehicle spring.

Each of the resilient body portions is substantially T-shaped in contour and owing to the fact that each of said body portions is of skeleton formation, not only the outer portion, but also the inner portion thereof co-acts to relieve the shock in case of collision, and also co-acts to prevent damage to the rear of the vehicle in case of collision. The resilient body portions which may be termed impact elements, are of such shape and extent that their inner ends approach each other at the mid-plane of the car while at their outer ends they protect the wheels, thus presenting, in effect, a continuous bumper protection from side to side of the car, while, at the same time, having the advantages of rigidity of support, lightness and strength incident to their independence of construction and mounting.

Although the preferred construction of bumper, for the purpose set forth, is as described and claimed, yet it is to be understood that changes in the details of construction can be had which will fall within the light of the invention as claimed.

What I claim is:—

1. A bumper for the purpose set forth comprising a skeleton impact element formed of a strip of spring steel and T-shaped in contour, a clamping element formed of an upper and a lower section, said upper section including a rearwardly extending and upwardly curved shank having its lower face curved throughout for seating on the upper face of the vehicle spring and said upper section further including a body portion completely extending into the shank of said impact element, transversely extending means for fixedly securing said body portion to the shank of said impact element, said lower section having its upper face curved throughout and adapted to be positioned against the lower face of the vehicle spring, and vertically disposed means arranged at each side of and extending through said sections for securing them together and for connecting the vehicle spring therewith.

2. A bumper for the purpose set forth comprising a skeleton impact element formed of a strip of spring steel and T-shaped in contour, a clamping element formed of an upper and a lower section, said upper section including a rearwardly extending and upwardly curved shank having its lower face curved throughout for seating on the upper face of the vehicle spring and said upper section further including a body portion completely extending into the shank of said impact element, transversely extending means for fixedly securing said body portion to the shank of said impact element, said lower section having its upper face curved throughout and adapted to be positioned against the lower face of the vehicle spring, and vertically disposed means arranged at each side of and extending through said sections for securing them together and for connecting the vehicle spring therewith, said lower section of less length than the length of the shank of the upper section and having its rear end flush with the rear end of said shank.

In testimony whereof, I affix my signature hereto.

CLARENCE V. GESSLER.